(12) United States Patent
Kitamura et al.

(10) Patent No.: US 7,067,575 B2
(45) Date of Patent: Jun. 27, 2006

(54) WATER-SOLUBLE FILM OF POLYVINYL ALCOHOL

(75) Inventors: Syuichi Kitamura, Ibaraki (JP); Tomoyoshi Mizutani, Ibaraki (JP); Mitsuhiro Hasegawa, Ibaraki (JP); Hideki Oono, Ibaraki (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 65 days.

(21) Appl. No.: 10/703,519

(22) Filed: Nov. 10, 2003

(65) Prior Publication Data

US 2004/0092635 A1 May 13, 2004

(30) Foreign Application Priority Data

Nov. 11, 2002 (JP) .............................. 2002-326747

(51) Int. Cl.
*C08K 5/053* (2006.01)
*C08L 29/04* (2006.01)

(52) U.S. Cl. ...................... 524/388; 524/386; 524/389; 524/557

(58) Field of Classification Search ................ 524/447, 524/386, 388, 389, 557
See application file for complete search history.

(56) References Cited

U.S. PATENT DOCUMENTS 6,166,117 A * 12/2000 Miyazaki ................... 524/291

FOREIGN PATENT DOCUMENTS

| EP | 0079712 A1 | 5/1983 |
| EP | 0291198 A2 | 11/1988 |
| EP | 1251147 A1 | 10/2002 |
| JP | 4-170405 | 6/1992 |
| JP | 7-18145 | 1/1995 |
| JP | 09-272772 | 10/1997 |
| JP | 10-060207 | 3/1998 |
| JP | 2001-329130 | 11/2001 |

OTHER PUBLICATIONS

Derwent database XP-002264098; JP2163149A- Jun. 22, 1999; see search report.
Derwent database XP002264097; JP2001-1329130; Nov. 27, 2001; see search report.
EP Search report dated Dec. 22, 2003.

* cited by examiner

*Primary Examiner*—Vasu Jagannathan
*Assistant Examiner*—Vickey Ronesi
(74) *Attorney, Agent, or Firm*—Armstrong, Kratz, Quintos, Hanson & Brooks, LLP

(57) ABSTRACT

A water-soluble film made from a resin composition comprising (A) 100 parts by weight of an anionic group-modified polyvinyl alcohol having a viscosity of 10 to 35 mPa·s measured at 20° C. with respect to a 4% by weight aqueous solution thereof, an average degree of hydrolysis of 80.0 to 99.9% by mole and a rate of anionic group modification of 1 to 10% by mole, (B) 20 to 50 parts by weight of a plasticizer, (C) 2 to 30 parts by weight of a filler, and (D) 0.01 to 2.5 parts by weight of a surfactant. The water-soluble film has an excellent water solubility, and is not gelled or insolubilized even if chemicals containing a boric acid substance, particularly sodium perborate, are packaged therein or even if it is put in an aqueous solution of a boric acid substance, particularly sodium perborate.

6 Claims, No Drawings

WATER-SOLUBLE FILM OF POLYVINYL ALCOHOL

BACKGROUND OF THE INVENTION

The present invention relates to a water-soluble film comprising an anionic group-modified polyvinyl alcohol (polyvinyl alcohol being hereinafter referred to as PVA resin) as a main component. More particularly, the invention relates to a water-soluble film which can maintain its original water solubility without causing gelation when applied to the use in packaging of various chemicals such as detergents, particularly detergents containing a boric substance, especially sodium perborate, and the solubility of which is not affected even if the film is thrown in an aqueous solution containing a boric substance, especially sodium perborate.

PVA resin films have been used, utilizing the water solubility, for unit-dose packaging (unit pack) of chemicals such as agricultural chemicals and detergents, wherein a unit dose of a chemical is packed in a bag made from a PVA resin film.

As a film used for preparing water-soluble unit packaging bags are known, for instance, a water-soluble film comprising a modified PVA resin containing 1 to 10% by mole of carboxyl group and having a degree of hydrolysis of at least 80% by mole and a viscosity of at least 46 cPs measured at 20° C. with respect to 4% by weight aqueous solution thereof (e.g., JP-A-4-170405), a water-soluble film comprising a modified PVA resin having an anionic group modification ratio of 2.0 to 40.0% by mole and a water-insoluble or slightly water-soluble fine powder having an average particle size of at most 150 μm (e.g., JP-A-10-060207), and a water-soluble film comprising a PVA resin incorporated with, per 100 parts by weight of PVA resin, 5 to 30 parts by weight of a plasticizer, 1 to 10 parts by weight of starch and 0.01 to 2 parts by weight of a surfactant (e.g., JP-A-2001-329130).

Such known water-soluble films can be utilized for packaging various chemicals. Chemicals to be unit-packaged are frequently incorporated with boric acid substances, particularly sodium perborate, for the purpose of impartment of bactericidal or insecticidal action, prevention of putrefaction, and oxidation bleaching. Known PVA resin films as mentioned above react with the boric acid substances and become insoluble in cold water to result in loss of the function, if chemicals containing boric acid substances even in a small amount are packaged in the films, or if the films are thrown in an aqueous solution containing the boric acid substances even if the chemicals packaged in the films do not contain the boric acid substances.

In order to eliminate such defect, as a material for packaging chemicals containing boric acid substances is proposed a water-soluble film made from a composition comprising 100 parts by weight of a PVA resin and 2 to 100 parts by weight of a compound obtained by addition reaction of 1 to 4 moles of an alkylene oxide to 1 mole of a tetra- to hexahydric alcohol (e.g., JP-A-9-272772). Since the addition reaction product of alkylene oxide to polyhydric alcohol is incorporated as a boric acid catcher into PVA resin, the proposed PVA resin film has the advantage that the gelation of PVA resin caused by the reaction of PVA resin and boric acid can be prevented when the PVA resin is in the form of a film, in other words, deterioration in the water-solubility of the PVA resin film during the storage of packages can be prevented. However, in the state that a package is put in water and once the system turns to an aqueous solution of a boric acid substance by dissolution of a part of the PVA resin film, or in the state that the package is directly put in an aqueous solution of a boric acid substance, it is difficult to completely dissolve the PVA resin film in the system. Therefore, the proposed PVA resin film has the disadvantage that the gelled PVA resin remains and, if the film is used for packaging a detergent, it sticks to clothes, so the proposed film is not satisfactory in practicability.

Accordingly, an object of the present invention is to provide a water-soluble film which is suitable for packaging chemicals containing a boric acid substance, particularly sodium perborate, and which exhibits an excellent water-solubility without being gelled even in an aqueous solution of a boric acid substance, particularly sodium perborate, to say nothing of during the storage of packages wherein chemicals containing a boric acid substance are packaged in the film.

This and other objects of the present invention will become apparent from the description hereinafter.

SUMMARY OF THE INVENTION

In accordance with the present invention, there is provided a water-soluble film made from a resin composition comprising (A) 100 parts by weight of an anionic group-modified polyvinyl alcohol having a viscosity of 10 to 35 mPa·s measured at 20° C. with respect to a 4% by weight aqueous solution thereof, an average degree of hydrolysis of 80.0 to 99.9% by mole and a rate of anionic group modification of 1 to 10% by mole, (B) 20 to 50 parts by weight of a plasticizer, (C) 2 to 30 parts by weight of a filler, and (D) 0.01 to 2.5 parts by weight of a surfactant.

The water-soluble film of the present invention has a very excellent water solubility, and is not gelled or insolubilized even if chemicals containing a boric acid substance, particularly sodium perborate, are packaged therein or even if it is put in an aqueous solution of a boric acid substance, particularly sodium perborate. The film of the present invention is useful as a material for various packaging purposes, particularly unit packaging of chemicals and the like. Particularly, the film of the present invention is useful for packaging liquid detergents which have a water content of less than 10% by weight, preferably 0.1 to 7% by weight and which show a pH of 6 to 12, preferably 7 to 11, when dissolved or dispersed in water, and the film is also useful for packaging a powdery detergent containing a perborate. The film can sufficiently exhibit its effects in these uses.

DETAILED DESCRIPTION

Any anionic group-modified polyvinyl alcohol resins can be used as the PVA resin (A) in the present invention. Anionic group which has been introduced to modify PVA resins includes, for instance, carboxyl group, sulfonic acid group, phosphoric acid group, and the like. Carboxyl group and sulfonic acid group, particularly carboxyl group, are preferable from the viewpoints of chemical resistance and stability for a long term (less lowering in cold water solubility with the lapse of time).

A method for preparing a carboxyl group-modified PVA resin will be explained below.

Carboxyl group-modified PVA resin can be prepared by any methods. For example, the preparation can be performed by (1) a method wherein an unsaturated monomer having carboxyl group and a vinyl ester compound are copolymerized and the resulting copolymer is hydrolyzed, and (2) a method wherein a vinyl ester compound is polymerized in the presence of a chain transfer agent such as a carboxyl group-containing alcohol, aldehyde or thiol compound and the resulting polymer is hydrolyzed. These methods (1) and (2) will be explained below, but the methods for the preparation of the modified PVA resin are not limited thereto.

(1) Method by Copolymerization of Carboxyl Group-Containing Unsaturated Monomer and Vinyl Ester Followed by Hydrolysis Examples of the carboxyl group-containing unsaturated monomer used in the method (1) are, for instance, an ethylenically unsaturated dicarboxylic acid such as maleic acid, fumaric acid or itaconic acid; an ethylenically unsaturated dicarboxylic acid monoester such as a monoalkyl maleate, a monoalkyl fumarate or a monoalkyl itaconate; an ethylenically unsaturated dicarboxylic acid diester such as a dialkyl maleate, a dialkyl fumarate or a dialkyl itaconate, provided that these diesters must be converted into carboxyl group by hydrolysis when the resulting copolymers are hydrolyzed; an ethylenically unsaturated dicarboxylic anhydride such as maleic anhydride or itaconic anhydride; an ethylenically unsaturated monocarboxylic acid such as (meth)acrylic acid or crotonic acid; and salts of these compounds, e.g., alkali metal salts such as potassium salt and sodium salt. Of these, maleic acid, monoalkyl maleates, salts of maleic acid and maleic anhydride are particularly preferable, and monoalkyl maleates are the most preferable.

(2) Method by Polymerization of Vinyl Ester in the Presence of Carboxyl Group-Containing Chain Transfer Agent Followed by Hydrolysis In this method, compounds derived from a thiol are particularly effective as they have a large chain transfer effect, and include, for instance, a compound of the formula (1):

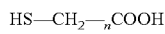

$$HS-CH_2{-}_n COOH \quad (1)$$

wherein n is 0 or an integer of 1 to 5, a compound of the formula (2):

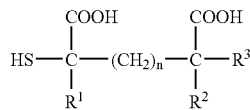

(2)

wherein $R^1$, $R^2$ and $R^3$ are independently hydrogen atom or a lower alkyl group, e.g., an alkyl group having 1 to 5 carbon atoms, which may be substituted, and n is 0 or an integer of 1 to 5, and a compound of the formula (3):

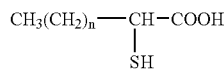

$$CH_3(CH_2)_n-CH-COOH \\ | \\ SH \quad (3)$$

wherein n is 0 or an integer of 1 to 20, and salts of the compounds (1) to (3) such as potassium and sodium salts.

Typical examples thereof are mercaptoacetic acid, 2-mercaptopropionic acid, 3-mercaptopropionic acid, 2-mercaptostearic acid, and the like.

Examples of the vinyl ester compound used in the methods (1) and (2) are, for instance, vinyl formate, vinyl acetate, vinyl trifluoroacetate, vinyl propionate, vinyl butyrate, vinyl caprate, vinyl laurate, vinyl ester of Versatics, vinyl palmitate, vinyl stearate, and the like. These may be used alone or in admixture thereof. Vinyl acetate is suitable from a practical point of view.

In the methods (1) and (2), the polymerization may be carried out by using, besides a carboxyl group-containing unsaturated monomer and a vinyl ester compound, other monomers, e.g., monomers conventionally used in known PVA resins, in a small amount such that the water solubility of the resulting modified PVA resins (A) is not impaired. Examples of the other monomers are, for instance, alkyl esters of ethylenically unsatureated monocarboxylic acids, e.g., methyl crotonate, ethyl crotonate, methyl sorbate, ethyl sorbate, alkyl oleates, methyl (meth)acrylate, ethyl (meth)acrylate, propyl (meth)acrylate, butyl (meth)acrylate, pentyl (meth)acrylate, heptyl (meth)acrylate, octyl (meth)acrylate, decyl (meth)acrylate, hexadecyl (meth)acrylate, octadecyl (meth)acrylate, and the like; allyl esters of saturated carboxylic acids, e.g., allyl stearate, allyl laurate, coconut oily fatty acid allyl ester, allyl octylate, allyl butyrate, and the like; α-olefins, e.g., ethylene, propylene, α-hexene, α-octene, α-decene, α-dodecene, α-hexadecene, α-octadecene, and the like; alkyl vinyl ethers, e.g., propyl vinyl ether, butyl vinyl ether, hexyl vinyl ether, octyl vinyl ether, decyl vinyl ether, dodecyl vinyl ether, tetradecyl vinyl ether, hexadecyl vinyl ether, octadecyl vinyl ether, and the like; alkyl allyl ethers, e.g., propyl allyl ether, butyl allyl ether, hexyl allyl ether, octyl allyl ether, decyl allyl ether, dodecyl allyl ether, tetradecyl allyl ether, hexadecyl allyl ether, octadecyl allyl ether, and the like; and other vinyl monomers, e.g., (meth)acrylamide, (meth)acrylonitrile, styrene, vinyl chloride and the like.

The polymerization method is not particularly limited, and any known polymerization methods can be suitably used. A solution polymerization using an alcohol such as methanol, ethanol or isopropanol as a solvent is usually practiced. Emulsion polymerization, suspension polymerization and the like are also of course adoptable. As to a manner of charging monomers in such a solution polymerization, any manners can be used, e.g., a manner wherein a whole amount of a vinyl ester monomer and a part of a carboxyl group-containing unsaturated monomer are charged in a reactor and a polymerization is started, and the remaining monomer is continuously or stepwise added, and a manner wherein a monomer or monomers are added at one time to a reactor.

In case that there is a concern that the modified PVA resin is insolubilized by formation of lactone ring or the like, according to a method known to provide PVA resin having a good water solubility a vinyl ester can be copolymerized with maleic acid or maleic anhydride in an organic solvent in the presence of 0.5 to 2.0 molar equivalents of an alkali.

The polymerization reaction is carried out by using a known radical polymerization catalyst, e.g., azobisisobutyronitrile, acetyl peroxide, benzoyl peroxide or lauroyl peroxide. The reaction temperature is selected from the range between about 50° C. and the boiling point of a solvent.

The obtained vinyl ester polymer is hydrolyzed by a known method. Usually the vinyl ester polymer is dissolved in a solvent such as an alcohol and is hydrolyzed in the presence of a hydrolysis catalyst such as an alkali. Examples of the alcohol are methanol, ethanol, butanol and the like. The concentration of the polymer in the alcohol solution is selected within the range of 20 to 50% by weight.

As the hydrolysis catalyst are used an alkali catalyst, e.g., a hydroxide or alcoholate of an alkali metal such as sodium hydroxide, potassium hydroxide, sodium methylate, sodium ethylate or potassium methylate. An acid catalyst such as sulfuric acid or hydrochloric acid can also be used depending on the situation. The amount of the hydrolysis catalyst is from 1 to 100 millimolar equivalents based on the vinyl ester compound.

Usually, carboxyl groups in the carboxyl group-containing PVA resin prepared by the method as mentioned above are in the state of alkali metal salt such as sodium salt. If there is an apprehension that the carboxyl group-containing PVA resin is insolubilized at the time of drying by formation of lactone ring, the insolubilization can be avoided by replacing the alkali metal salt with a salt of a bivalent metal such as calcium, magnesium, copper or the like.

The carboxyl group-containing PVA resin can also be prepared by other methods than the methods (1) and (2), for instance, by post reaction of polyvinyl alcohol (partially hydrolyzed PVA resin or completely hydrolyzed PVA resin) with a carboxyl group-containing compound having a functional group reactable with hydroxyl group, such as a dicarboxylic acid, an aldehydecarboxylic acid or a hydroxycarboxylic acid.

The thus obtained carboxyl group-modified PVA resin is used as the anionic group-modified PVA resin (A). Sulfonic acid group-modified PVA resin can be prepared by known methods, for instance, by a method wherein a vinyl ester compound is copolymerized with a sulfonic acid group-containing comonomer, e.g., vinylsulfonic acid, styrenesulfonic acid, allylsulfonic acid, methallylsulfonic acid or 2-acrylamido-2-methylpropanesulfonic acid, and the resulting copolymer is hydrolyzed, and a method wherein sulfonic acid group is introduced to PVA resin by Michael addition reaction of a sulfonic acid group-containing unsaturated compound, e.g., vinylsulfonic acid or its salt, 2-acrylamido-2-methylpropane-sulfonic acid or its salt, or the like, to PVA resin.

In the present invention, the rate of modification of the anionic group-modified PVA resin (A) (content of anionic group-containing unit in the anionic group-modified PVA resin) is from 1 to 10% by mole, preferably 2 to 6% by mole, more preferably 3 to 5% by mole. If the rate of modification is less than 1% by mole, films are affected by sodium perborate included in chemicals to markedly lower the water solubility. If the rate of modification is more than 10% by mole, the modified PVA resin is not practical since the productivity in producing PVA resin powder is lowered or the biodegradability of films is lowered.

The average degree of hydrolysis of the anionic group-modified PVA resin (A) is from 80.0 to 99.9% by mole, preferably 90.0 to 98.5% by mole, more preferably from 92.0 to 97.0% by mole. If the average degree of hydrolysis is less than 80.0% by mole, the solubility of films may lower with the lapse of time depending on the pH of liquid chemicals packaged in the films or like troubles may occur. If the average degree of hydrolysis is more than 99.9% by mole, the water solubility is markedly lowered by heat history received at the time of film formation.

The anionic group-modified PVA resin (A) used in the present invention has a viscosity of 10 to 35 mPa·s, preferably 15 to 30 mPa·s, more preferably 15 to 25 mPa·s, measured at 20° C. with respect to a 4% by weight aqueous solution thereof. If the viscosity is less than 10 mPa·s, the mechanical strength of films as a packaging material is low, and if the viscosity is more than 35 mPa·s, the viscosity of an aqueous solution of the modified PVA resin prepared for film formation becomes high, so the productivity is lowered.

The above-mentioned average degree of hydrolysis is measured according to JIS K 6726-3.5, and the viscosity of 4% aqueous solution is measured according to JIS K 6726-3.11.2.

The anionic group-modified PVA resin (A) is incorporated with a plasticizer (B), a filler (C), a surfactant (D) and optionally other additives to give a resin composition from which films are formed.

The plasticizer (B) used in the present invention is not particularly limited, and plasticizers conventionally used in PVA resin films can be used. Examples of the plasticizer (B) are, for instance, glycerol, trimethylolpropane, diglycerol, diethylene glycol, trietylene glycol, propylene glycol, dipropylene glycol, pentaerythritol, polyethylene glycol, polypropylene glycol, bisphenol A, bisphenol S, N-methylpyrrolidone, sorbitol, mannitol, xylitol, 2,3-butanediol, 1,3-butanediol, reducing maltose (reducing starch hydrolyzate by malt), reducing lactose, reducing starch sugar, and the like. The plasticizers may be used alone or in admixture thereof. Combined use of glycerol with trimethylolpropane and/or diglycerol is preferable from the viewpoint of time-lapse stability of films.

In case of using glycerol in combination with trimethylolpropane and/or diglycerol, the ratio of glycerol to trimethylolpropane and/or diglycerol is preferably from 15/85 to 85/15 by weight, especially 20/80 to 80/20 by weight, more especially 25/75 to 75/25 by weight. When the ratio is less than 15/85 by weight, the plasticizing effect at a temperature lower than ordinary temperature is low, and when the ratio is more than 85/15 by weight, a desired time-lapse stability is not obtained.

The amount of the plasticizer (B) is from 20 to 50 parts by weight, preferably 21 to 45 parts by weight, more preferably 21 to 40 parts by weight, per 100 parts by weight of the modified PVA resin (A). If the amount of the plasticizer (B) is less than 20 parts by weight, the solubility of films in an aqueous solution of sodium perborate is lowered. If the amount is more than 50 parts by weight, the plasticizer is easy to bleed from films to cause blocking of films.

As the filler (C) can be used inorganic fillers and organic fillers. The filler (C) serves to improve the blocking resistance of films.

Inorganic fillers are preferably those having an average particle size of 1 to 10 μm. If the average particle size is less than 1 μm, the effect of preventing blocking of films is insufficient, and if it is more than 10 μm, the appearance of films is deteriorated to decrease the commodity value. Examples of the inorganic filler are, for instance, talc, clay, silicon dioxide, diatomaceous earth, kaolin, mica, asbestos, gypsum, graphite, glass balloon, glass beads, calcium sulfate, barium sulfate, ammonium sulfate, calcium sulfite, calcium carbonate, whisker-like calcium carbonate, magnesium carbonate, dawsonite, dolomite, potassium titanate, carbon black, glass fiber, alumina fiber, boron fiber, processed mineral fiber, carbon fiber, carbon hollow beads, bentonite, montmorillonite, copper powder, sodium sulfate, potassium sulfate, zinc sulfate, copper sulfate, iron sulfate, magnesium sulfate, potassium aluminum sulfate, ammonium nitrate, sodium nitrate, potassium nitrate, aluminum nitrate, ammonium chloride, sodium chloride, potassium chloride, magnesium chloride, calcium chloride, sodium phosphate, potassium chromate, calcium citrate, and the like.

The organic fillers are preferably those having an average particle size of 0.5 to 10 μm, especially 0.5 to 7 μm, more especially 0.5 to 5 μm, further more especially 0.5 to 3 μm. The use of organic fillers having an average particle size of less than 0.5 μm will cost, and organic fillers having an average particle size of more than 10 μm is poor in dispersibility. Examples of the organic fillers are, for instance, starch, melamine-based resins, methyl (meth)acrylate-based resins, styrene-based resins, biodegradable resins such as polylactic acid and rice starch, and the like. Methyl (meth) acrylate-based resins, styrene-based resins and biodegradable resins are preferred.

The amount of the filler (C) is from 2 to 30 parts by weight, preferably 2.5 to 25 parts by weight, more preferably 2.5 to 20 parts by weight, per 100 parts by weight of the modified PVA resin (A). If the amount of the filler (C) is less than 2 parts by weight, no effect of increasing the dispersibility of films into water is obtained. If the amount is more than 30 parts by weight, the dispersibility of films into water is lowered.

The surfactant (D) used in the present invention is not particularly limited, and known surfactants can be used. Examples of the surfactant (D) are, for instance, a polyoxyethylene alkyl phenyl ether such as polyoxyethylene nonyl phenyl ether or polyoxyethylene dodecyl phenyl ether, a polyoxyethylene alkyl ether such as polyoxyethylene octyl nonyl ether, a polyoxyethylene alkyl allyl ether, a polyoxyethylene sorbitan fatty acid ester such as polyoxyethylene sorbitan monolaurate, polyoxyethylene sorbitan monopalmitate, polyoxyethylene sorbitan monostearate or polyoxyethylene sorbitan monooleate, a polyoxyalkylene alkyl ether phosphate monoethanolamine salt, a polyoxyethylene alkylamine such as polyoxyethylene laurylamine or polyoxyethylene stearylamine, and the like. The surfactants may be used alone or in admixture thereof. Of these, polyoxyalkylene alkyl ether phosphate monoethanolamine salts and polyoxyethylene laurylamine are preferable from the viewpoint of manufacturing stability.

The amount of the surfactant (D) is from 0.01 to 2.5 parts by weight, preferably 0.5 to 2.2 parts by weight, more preferably 0.5 to 1.7 parts by weight, per 100 parts by weight of the modified PVA resin (A). If the amount of the surfactant (D) is less than 0.01 part by weight, the peelability of films formed by a film forming apparatus from the metallic surface such as drum or belt of the apparatus is lowered, so the films are produced with difficulty. If the amount is more than 2.5 parts by weight, the adhesion strength in heat sealing conducted when packaging chemicals in the films is lowered or like troubles may occur.

The resin composition containing the components (A) to (D) may be further incorporated with a starch, as occasion demand, for the purpose of imparting a blocking resistance to the obtained films or adjusting the mechanical strength of the films. The starch used for these purposes is preferably those having an average particle size of more than 10 μm which are different from a starch used as the filler (C) in the average particle size. Examples of the starch are, for instance, a raw starch such as corn starch, potato starch, sweet potato starch, wheat starch, cassava starch, sago starch, tapioka starch, rice starch, bean starch, kudzu starch, bracken starch, lotus starch or water chestnut starch; a physically modified starch such as a starch, discrete amylose or moist heat processed starch; an enzyme-modified starch such as hydroyzed dextrin, enzyme decomposed dextrin or amylose; chemically decomposed starch such as acid treated starch, hypochlorous acid-oxidized starch or dialdehyde starch; a chemically modified starch derivative such as esterified starch, etherified starch, cationized starch or crosslinked starch. The esteified starch includes acetic acid esterified starch, succinic acid esterfied starch, nitric acid esterified starch, phosphoric acid esterified starch, urea-phosphoric acid esterified starch, xanthic acid esterified starch, acetoacetic acid esterified starch, and the like. The etherified starch includes allyl etherified starch, methyl etherified starch, carboxymethyl etherified starch, hydroxyethyl etherified starch, hydroxypropyl etherified starch, and the like. The cationized starch includes a reaction product of starch and 2-diethylaminoethyl chloride, a reaction product of starch and 2,3-epoxypropyltrimethylammonium chloride, and the like. The crosslinked starch includes formaldehyde-crosslinked starch, epichlorohydrin-crosslinked starch, phosphoric acid-crosslinked starch, acrolein-crosslinked starch, and the like. Of these, raw starches are preferable from the availability and economy.

The amount of such a starch is not particularly limited, but preferably from 0.1 to 40 parts by weight, more preferably 1 to 30 parts by weight, per 100 parts by weight of the modified PVA resin (A). If the amount is less than 0.1 part by weight, anti-blocking effect and mechanical strength improving effect are not obtained. If the amount is more than 40 parts by weight, the appearance and elongation of films are markedly lowered.

The water-soluble PVA resin films of the present invention are prepared from the resin composition comprising the components (A) to (D) by known methods, e.g., casting.

In the case of carrying out the film formation by casting, water is added to the above-mentioned resin composition which is in the form of powder to give an aqueous dispersion or aqueous solution of the resin composition having a solid concentration of 10 to 50% by weight, preferably 15 to 35% by weight. Alternatively, a powder of the anionic group-modified PVA resin (A) is dissolved in water to give an aqueous solution of the modified PVA resin (A) having a solid concentration of 10 to 50% by weight, preferably 15 to 35% by weight, and plasticizer (B), filler (C) and surfactant (D) are added to the obtained aqueous solution to give an aqueous dispersion or aqueous solution of the resin composition having a solid concentration of 10 to 50% by weight, preferably 15 to 35% by weight. The obtained aqueous dispersion or solution is then passed through a slit such as T-die, cast onto a metal surface of endless belt or drum roll having a surface temperature of 50 to 100° C., preferably 70 to 95° C., dried and optionally heated-treated, thus providing water-soluble PVA resin films. If the concentration of the resin composition in the aqueous dispersion or solution to be cast is less than 10% by weight, the productivity is low, and if it is more than 50% by weight, defoaming of dope takes a longer time because of high viscosity or die lines generate when forming films. If the temperature of the metal surface is less than 50° C., drying takes a longer time, and if it is more than 100° C., the cast liquid foams.

The PVA resin films can also be prepared by casting the aqueous dispersion or solution of the resin composition, using an applicator, onto a plastic substrate such as polyethylene terephthalate film or polyethylene film or a metal substrate, and drying it.

The preparation of PVA resin films has been explained with respect to casting method, but is not limited thereto in the present invention.

It is preferable that the PVA resin films of the present invention have a glass transition temperature of at most 20° C., especially −10 to 15° C., more especially −10 to 10° C. If the glass transition temperature is more than 20° C., change in mechanical strength of the films depending on environment becomes large. The glass transition temperature of not higher than 20° C. can be achieved by suitably adjusting the kind and amount of the plasticizer, the degree of hydrolysis of the PVA resin (A), the heat treating temperature in the film formation, or the content of water in the films.

The term "glass transition temperature" of the PVA resin films as used herein means the peak temperature of main dispersion obtained when continuously measuring the dynamic viscoelasticity at a measuring frequency of 2 Hz with elevating the temperature from −50° C. to 150° C. at a rate of 3° C./minute in a dry atmosphere of 20° C. (moisture content: at most 1,000 ppm) by using a humidity conditioning visco-elastometer (model DVA-225 made by IT Kisokuseigyo Kabushiki Kaisha).

The thickness of the PVA resin films of the present invention may vary depending on purposes, but in general it is preferable that the thickness is from 5 to 100 μm, especially 10 to 80 μm. If the thickness is less than 5 μm, the mechanical strength of the films is low, and if the thickness is more than 100 μm, the rate of dissolution of the films into cold water is very slow and the film formation efficiency is also low.

The surface of the PVA resin films may be plane, or either or both surfaces may be provided with embossed pattern or satin crape finish.

The water-soluble films of the present invention may contain various known additives, as occasion demands, so long as the objects of the present invention are not impaired, e.g., other water-soluble polymers (unmodified PVA resins, modified PVA resins prepared by modification other than anionic group modification, polyacrylic acid sodium salt, polyethylene oxide, polyvinyl pyrrolidone, dextrin, chitosan, chitin, methyl cellulose, hydroxymethyl cellulose, etc.), a perfume, a rust inhibitor, a colorant, an extender, an antifoaming agent, a ultraviolet absorber, and the like.

The water-soluble films of the present invention are useful for various packaging applications, particularly unit packaging of chemicals and the like. The application to unit packaging will be explained below.

The chemicals to be packaged are not particularly limited. The films of the present invention are suitable for packaging chemicals which are dissolved or dispersed in water when using. The chemicals may be alkaline, neutral or acidic, and may be in any state of granules, tablets, powder, liquid or the like.

In particular, the films of the present invention are useful for packaging liquid detergents which have a water content of less than 10% by weight, preferably 0.1 to 7% by weight, and which show a pH of 6 to 12, preferably 7 to 11, when dissolved or dispersed in water. The films are also useful for packaging powdery detergents containing perboric acid salts. Even if chemicals containing boric acid substances, particularly sodium perborate, are packaged in the films of the present invention or even if the films are placed in an aqueous solution containing boric acid substances, particularly sodium perborate, the films maintain an excellent water solubility without being gelled or insolubilized and can sufficiently exhibit the effects of the present invention.

The packaging of chemicals in the water-soluble films of the present invention can be performed, for instance, by (1) a method wherein bags are previously prepared from the films and chemicals are packaged in the bags, and (2) a method wherein chemicals are directly packaged in the films.

The present invention is more specifically described and explained by means of the following Examples in which all parts and % are by weight unless otherwise noted.

EXAMPLE 1

An aqueous dispersion of a resin composition having a solid concentration of 29% was prepared by mixing 100 parts of a carboxyl group-modified PVA resin (A) having a 4% aqueous solution viscosity of 22.0 mPa·s (at 20° C.), an average degree of hydrolysis of 97.2% by mole and a rate of modification of 4.0% by mole (modification with monomethyl maleate), 25 parts of glycerol and 12 parts of trimethylolpropane as plasticizer (B), 5 parts of silicon dioxide having an average particle size of 6.4 μm as filler (C), 2 parts of polyoxyalkylene alkyl ether phosphate monoethanolamine salt as surfactant (D), and 355 parts of water.

The obtained aqueous dispersion was defoamed at 80° C., cast onto a hot plate kept at a temperature of 80 to 90° C. and then dried at a temperature of 80 to 90° C. for 1 minute to give a PVA resin film having a thickness of 76 μm. The obtained film had a glass transition temperature of −3° C.

The obtained film was evaluated according to the following methods.

Solubility of Film in Aqueous Solution of Sodium Perborate

The obtained PVA resin film was cut to a size of 12 cm×10 cm and formed into a bag having a size of 6 cm×10 cm by folding the cut film and heat-sealing the two sides thereof by a heat sealer. In the bag was placed 30 g of a liquid detergent having a pH of 9.0 and a water content of 1.5% (main components: higher fatty acid, pentaethylene glycol, dipropylene glycol monomethyl ether), and the remaining side of the bag was heat-sealed to give a chemical package (size 6 cm×10 cm).

One liter of an aqueous solution of sodium perborate of 25° C. (concentration: 3 g sodium perborate per liter of water) was placed in 1 liter beaker. The chemical package was put in the solution with stirring by a stirrer, and the stirring was continued for 10 minutes. The solution was then filtered with a sieve of 42 meshes. The filtered matter on the sieve was observed and evaluated as follows:

◯: No filtered matter is present.

X: A filtered matter is present.

Water Solubility of Package of Chemical Containing Sodium Perborate

The obtained PVA resin film was cut to a size of 12 cm×10 cm and formed into a bag having a size of 6 cm×10 cm by folding the cut film and heat-sealing the two sides thereof by a heat sealer. In the bag was placed 12 g of a powder detergent obtained by incorporating 25 parts of sodium perborate into 100 parts of a commercially available powder detergent for clothes (trade mark "Ariel", made by P&G Kabushiki Kaisha), and the remaining side of the bag was heat-sealed to give a packet-like chemical package (size 6 cm×10 cm).

One liter of water of 25° C. was placed in 1 liter beaker. The chemical package was put in water with stirring by a stirrer, and the stirring was continued for 10 minutes. The resulting solution was then filtered with a sieve of 42 meshes. The filtered matter on the sieve was observed and evaluated as follows:

◯: No filtered matter is present.

X: A filtered matter is present.

The results are shown in Table 1.

EXAMPLE 2

An aqueous dispersion of a resin composition having a solid concentration of 25.8% was prepared by mixing 100 parts of a carboxyl group-modified PVA resin (A) having a 4% aqueous solution viscosity of is 20.0 mPa·s (at 20° C.), an average degree of hydrolysis of 97.9% by mole and a rate of modification of 4.2% by mole (modification with monomethyl maleate), 15 parts of glycerol and 7 parts of trimethylolpropane as plasticizer (B), 5 parts of silicon dioxide having an average particle size of 6.4 µm as filler (C), 2 parts of polyoxyalkylene alkyl ether phosphate monoethanolamine salt as surfactant (D), and 371 parts of water.

The obtained aqueous dispersion was defoamed and cast in the same manner as in Example 1 to give a PVA resin film having a thickness of 76 µm. The obtained film had a glass transition temperature of 12° C.

The obtained film was evaluated in the same manner as in Example 1. The results are shown in Table 1.

EXAMPLE 3

An aqueous dispersion of a resin composition having a solid concentration of 30.4% was prepared by mixing 100 parts of a carboxyl group-modified PVA resin (A) having a 4% aqueous solution viscosity of 18.0 mPa·s (at 20° C.), an average degree of hydrolysis of 95.1% by mole and a rate of modification of 3.8% by mole (modification with monomethyl maleate), 25 parts of glycerol and 20 parts of trimethylolpropane as plasticizer (B), 5 parts of silicon dioxide having an average particle size of 6.4 µm as filler (C), 2 parts of polyoxyalkylene alkyl ether phosphate monoethanolamine salt as surfactant (D), and 348 parts of water.

The obtained aqueous dispersion was defoamed and cast in the same manner as in Example 1 to give a PVA resin film having a thickness of 76 µm. The obtained film had a glass transition temperature of –6° C.

The obtained film was evaluated in the same manner as in Example 1. The results are shown in Table 1.

EXAMPLE 4

An aqueous dispersion of a resin composition having a solid concentration of 31.8% was prepared by mixing 100 parts of a carboxyl group-modified PVA resin (A) having a 4% aqueous solution viscosity of 22.0 mPa·s (at 20° C.), an average degree of hydrolysis of 97.2% by mole and a rate of modification of 4.0% by mole (modification with monomethyl maleate), 25 parts of glycerol and 12 parts of trimethylolpropane as plasticizer (B), 20 parts of starch having an average particle size of 8 µm (trade mark "Ohji Ace A", made by Ohji Corn Starch Kabushiki Kaisha) as filler (C), 2 parts of polyoxyalkylene alkyl ether phosphate monoethanolamine salt as surfactant (D), and 341 parts of water.

The obtained aqueous dispersion was defoamed and cast in the same manner as in Example 1 to give a PVA resin film having a thickness of 76 µm. The obtained film had a glass transition temperature of –3° C.

The obtained film was evaluated in the same manner as in Example 1. The results are shown in Table 1.

COMPARATIVE EXAMPLE 1

An aqueous solution of a resin composition having a solid concentration of 25% was prepared by mixing 100 parts of a carboxyl group-modified PVA resin (A) having a 4% aqueous solution viscosity of is 22.0 mPa·s (at 20° C.), an average degree of hydrolysis of 97.2% by mole and a rate of modification of 4.0% by mole (modification with monomethyl maleate), 25 parts of an addition reaction product of 3 moles of ethylene oxide to 1 mole of sorbitol, and 375 parts of water.

The obtained aqueous solution was defoamed and cast in the same manner as in Example 1 to give a PVA resin film having a thickness of 76 µm. The obtained film had a glass transition temperature of 12° C.

The obtained film was evaluated in the same manner as in Example 1. The results are shown in Table 1.

COMPARATIVE EXAMPLE 2

A PVA resin film having a thickness of 76 µm was prepared in the same manner as in Example 1 except that as an anionic group-modified PVA resin (A) was used a carboxyl group-modified PVA resin having a 4% aqueous solution viscosity of 6 mPa·s (at 20° C.), an average degree of hydrolysis of 97.5% by mole and a rate of modification of 4.0% by mole (modification with monomethyl maleate). The obtained film had a glass transition temperature of –3° C.

The obtained PVA resin film is poor in mechanical property (elongation) and therefore is not practical.

COMPARATIVE EXAMPLE 3

It was attempted to prepare a carboxyl group-modified PVA resin having a 4% aqueous solution viscosity of 47 mPa·s (at 20° C.), an average degree of hydrolysis of 97.5% by mole and a rate of modification of 4.0% by mole (modification with monomethyl maleate). However, the carboxyl group-modified PVA resin having such a high viscosity took a long time for the preparation and, therefore, was not practical since the productivity was low.

COMPARATIVE EXAMPLE 4

A PVA resin film having a thickness of 76 µm was prepared in the same manner as in Example 1 except that as an anionic group-modified PVA resin (A) was used a carboxyl group-modified PVA resin having a 4% aqueous solution viscosity of 14 mPa·s (at 20° C.), an average degree of hydrolysis of 72% by mole and a rate of modification of 4.0% by mole (modification with monomethyl maleate). The obtained film had a glass transition temperature of –3° C.

The obtained PVA resin film was not practical, since the water solubility decreased with the lapse of time when an alkali chemical was packaged therein.

COMPARATIVE EXAMPLE 5

A PVA resin film having a thickness of 76 µm was prepared in the same manner as in Example 1 except that as an anionic group-modified PVA resin (A) was used a carboxyl group-modified PVA resin having a 4% aqueous solution viscosity of 30.0 mPa·s (at 20° C.), an average degree of hydrolysis of 97.0% by mole and a rate of modification of 0.9% by mole (modification with monomethyl maleate). The obtained film had a glass transition temperature of –3° C.

The obtained PVA resin film was evaluated in the same manner as in Example 1. The results are shown in Table 1.

COMPARATIVE EXAMPLE 6

It was attempted to prepare a carboxyl group-modified PVA resin having a rate of modification of more than 10% by mole (modification with monomethyl maleate). However, the carboxyl group-modified PVA resin having such a high rate of modification was not practical since the polymerization efficiency was low and the biodegradability was remarkably deteriorated.

COMPARATIVE EXAMPLE 7

A PVA resin film having a thickness of 76 µm was prepared in the same manner as in Example 1 except that 5 parts of glycerol and 1 part of trimethylolpropane were used as plasticizer (B). The obtained film had a glass transition temperature of 27° C.

The obtained PVA resin film was evaluated in the same manner as in Example 1. The results are shown in Table 1.

COMPARATIVE EXAMPLE 8

A PVA resin film having a thickness of 76 µm was prepared in the same manner as in Example 1 except that 30 parts of glycerol and 30 part of trimethylolpropane were used as plasticizer (B). The obtained film had a glass transition temperature of −12° C.

The obtained PVA resin film was not practical since the plasticizer bleeded out and therefore was poor in blocking resistance.

COMPARATIVE EXAMPLE 9

A PVA resin film having a thickness of 76 µm was prepared in the same manner as in Example 1 except that 1 part of the silicon dioxide was used as filler (C). The obtained film had a glass transition temperature of −3° C.

The obtained PVA resin film was not practical since the blocking resistance was poor.

COMPARATIVE EXAMPLE 10

A PVA resin film having a thickness of 76 µm was prepared in the same manner as in Example 1 except that 40 parts of the silicon dioxide was used as filler (C). The obtained film had a glass transition temperature of 7° C.

The obtained PVA resin film was evaluated in the same manner as in Example 1. The results are shown in Table 1.

COMPARATIVE EXAMPLE 11

A PVA resin film having a thickness of 76 µm was prepared in the same manner as in Example 1 except that 0.005 part of the polyoxyalkylene alkyl ether phosphate monoethanolamine salt was used as surfactant (D). The obtained film had a glass transition temperature of −3° C.

No film having a uniform surface was obtained, since the peelability of a film formed on the hot plate was poor, thus resulting in generation of many wrinkles.

COMPARATIVE EXAMPLE 12

A PVA resin film having a thickness of 76 µm was prepared in the same manner as in Example 1 except that 4 parts of the polyoxyalkylene alkyl ether phosphate monoethanolamine salt was used as surfactant (D). The obtained film had a glass transition temperature of −5° C.

A liquid detergent was packaged in the obtained PVA resin film, but it oozed out because of poor sealability.

TABLE 1

|  | Solubility of film in aqueous solution of sodium perborate | Solubility in water of package of chemical containing sodium perborate |
|---|---|---|
| Example 1 | ◯ | ◯ |
| Example 2 | ◯ | ◯ |
| Example 3 | ◯ | ◯ |
| Example 4 | ◯ | ◯ |
| Com. Ex. 1 | X | X |
| Com. Ex. 5 | X | X |
| Com. Ex. 7 | X | X |
| Com. Ex. 10 | X | X |

What is claimed is:

1. A water-soluble film made from a resin composition comprising (A) 100 parts by weight of a carboxyl group-modified polyvinyl alcohol having a viscosity of 10 to 35 mPa·s measured at 20° C. with respect to a 4% by weight aqueous solution thereof, an average degree of hydrolysis of 80.0 to 99.9% by mole and a rate of anionic group modification of 1 to 10% by mole, (B) 20 to 50 parts by weight of a plasticizer, (C) 2 to 30 parts by weight of a filler, and (D) 0.01 to 2.5 parts by weight of a surfactant, wherein said plasticizer (B) is a mixture of (B1) glycerol with (B2) at least one member selected from the group consisting of trimethylolpropane and diglycerol in a B1/B2 ratio of 25/75 to 75/25 by weight.

2. The film of claim 1, wherein said rate of anionic group modification is from 2 to 6% by mole.

3. The film of claim 1, wherein said anionic group-modified polyvinyl alcohol (A) is a carboxyl group-modified polyvinyl alcohol in which the modification is made with a member selected from the group consisting of maleic acid, a maleic acid salt, a monoalkyl maleate and maleic anhydride.

4. The film of claim 1, wherein said anionic group-modified polyvinyl alcohol (A) is a carboxyl group-modified polyvinyl alcohol in which the modification is made with a monoalkyl maleate.

5. The film of claim 1, wherein said average degree of hydrolysis is from 90.0 to 98.5% by mole.

6. The film of claim 1, which is used for packaging a liquid detergent having a pH of 6 to 12 and a water content of less than 10% by weight.

* * * * *